(12) United States Patent
Ternasky et al.

(10) Patent No.: US 7,813,000 B2
(45) Date of Patent: Oct. 12, 2010

(54) DEVICE COLOR CHARACTERIZATION PROFILE FORMAT

(75) Inventors: Joseph Donald Ternasky, Mountain View, CA (US); Michael Stokes, Eagle, ID (US); David Ornstein, Seattle, WA (US); James Alkove, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1225 days.

(21) Appl. No.: 10/747,628

(22) Filed: Dec. 30, 2003

(65) Prior Publication Data

US 2005/0146735 A1 Jul. 7, 2005

(51) Int. Cl.
*G06F 15/00* (2006.01)
*G03F 3/08* (2006.01)
*H04N 1/46* (2006.01)
*G06K 9/00* (2006.01)

(52) U.S. Cl. .................. 358/1.9; 358/518; 358/519; 358/523; 358/539; 382/162; 382/167; 345/600; 345/589

(58) Field of Classification Search .......... 358/1.9, 358/1.15, 518
See application file for complete search history.

(56) References Cited

U.S. PATENT DOCUMENTS

| | | | | |
|---|---|---|---|---|
| 6,037,950 | A * | 3/2000 | Meir et al. | 345/427 |
| 6,439,722 | B1 * | 8/2002 | Seegers et al. | 351/243 |
| 6,480,299 | B1 * | 11/2002 | Drakopoulos et al. | 358/1.9 |
| 6,603,879 | B2 * | 8/2003 | Haikin et al. | 382/167 |
| 6,744,534 | B1 * | 6/2004 | Balasubramanian et al. | 358/1.9 |
| 6,978,043 | B1 * | 12/2005 | Haikin et al. | 382/167 |
| 6,980,325 | B1 * | 12/2005 | Sugiura et al. | 358/1.9 |
| 7,042,583 | B1 * | 5/2006 | Wilkins et al. | 358/1.15 |
| 7,080,058 | B1 * | 7/2006 | Upadhyayula et al. | 707/1 |
| 7,093,296 | B2 * | 8/2006 | Nusser et al. | 726/26 |
| 7,222,062 | B2 * | 5/2007 | Goud et al. | 703/23 |
| 7,359,884 | B2 * | 4/2008 | Ta et al. | 705/59 |
| 7,372,595 | B1 * | 5/2008 | Lyon et al. | 358/1.9 |
| 2003/0117639 | A1 * | 6/2003 | Milton et al. | 358/1.13 |
| 2003/0140243 | A1 | 7/2003 | Nusser et al. | |
| 2003/0182579 | A1 * | 9/2003 | Leporini et al. | 713/201 |

(Continued)

OTHER PUBLICATIONS

Fraser at al., Real World Color Management, 2003, pp. 100-103, Peachpit Press, Berkeley, CA.

(Continued)

*Primary Examiner*—Edward L Coles
*Assistant Examiner*—Hilina S Kassa
(74) *Attorney, Agent, or Firm*—Shook, Hardy & Bacon, L.L.P.

(57) ABSTRACT

A color characterization profile format and data structure are provided for allowing a color management solution to convert colors into or out of a color space. The color characterization profile format contains a color management measurement data portion and a container that is configured to provide digital rights management capabilities over the color characterization profile format. The container can include linked and embedded objects and extensible markup language. Further, the container can be an advanced systems format container. The container can be configured to perform different functions, including enabling private data extensions, operating interface description language, storing a rendering intent separate from the color management measurement data portion, the ability to be edited by a text editor application, operability across a plurality of operating platforms, and preventing a user from tampering with the color characterization profile format.

29 Claims, 10 Drawing Sheets

U.S. PATENT DOCUMENTS

| | | | | |
|---|---|---|---|---|
| 2004/0004731 | A1* | 1/2004 | Itagaki | 358/1.9 |
| 2005/0094875 | A1* | 5/2005 | Haikin | 382/162 |
| 2005/0138370 | A1* | 6/2005 | Goud et al. | 713/164 |
| 2005/0280853 | A1* | 12/2005 | Newman et al. | 358/1.9 |
| 2006/0059253 | A1* | 3/2006 | Goodman et al. | 709/223 |

OTHER PUBLICATIONS

Messerges, Thomas S. et al., "Digital Rights Management in a 3G Mobile Phone and Beyond," Oct. 27, 2003, pp. 27-38, DRM'03, Washington, DC USA.

Wallner, Dawn, ICC Specification ICC.1:2000, "Building ICC Profiles—the Mechanics and Engineering," Apr. 2000, pp. 6-11 (Chapter 2), http://www.color.org/icc-book1.pdf.

*XML-Signature Syntax and Processing W3C Recommendation* of Dec. 10, 2002 (http://www.w3.org/TR/xmlenc-core/), published by the Internet Engineering Task Force (IETF).

*XML-Signature Syntax and Processing W3C Recommendation* of Feb. 12, 2002 (http:/www.w3.org.TR /xmldsig-core/), published by the Internet Engineering Task Force (IETF).

*Namespaces in XML*, IETF, World Wide Web Consortium; Jan. 14, 1999 (www.w3.org/TR/1999/REC-xml-names-19990114/)).

*XML Schema Part 0: Primer W3C Recommendation* (http:/www.w3.org.TR/xmlschema-0/) of May 2. 2001, published by the Internet Engineering Task Force (IETF).

*XML Schema Part 1: Structures W3C Recommendation* (http:/www.w3.org.TR/xmlschema-1/) of May 2, 2001, published by the Internet Engineering Task Force (IETF).

*XML Schema Part 2: Datatypes W3C Recommendation* (http:/www.w3.org.TR/xmlschema-2/) of May 2, 2001, published by the Internet Engineering Task Force (IETF).

*Common Language Infrastructure* (CLI) (Standard ECMA-335: ECMA International; $2^{nd}$ Edition; Dec. 2002 (www.ecma-international.org/ publications/files/ECMA-ST/Ecma-335.pdf)).

*Advanced Systems Format (ASF) Specification* (Revision 01.20.01e; Microsoft Corporation® of Redmond, WA; Sep. 5, 2003 (http://download.microsoft.com/download/e/0/6/e06db390-1e2a-4978-82bb-311819d8a2d/ASF_Specification.doc).

Kraig Brockschmidt, "*Developing Applications with OLE 2.0*", Sep. 13, 1994, (http://msdn.microsoft.com/library/en-us/dnolegen/html/msdn_devwole2.asp?frame=true).

Kraig Brockschmidt, "*OLE Integration Technologies: A Technical Overview*", Oct. 1994 (http://msdn.microsoft.com/ library/en-us/dnolegen/html/msdn_ddjole.asp?frame=true).

Kraig Brockschmidt, "*What OLE is Really About*", Jul. 1996 (http://msdn.microsoft.com/library/en-us/dnolegen/html/msdn_aboutole.asp?frame=true)).

* cited by examiner

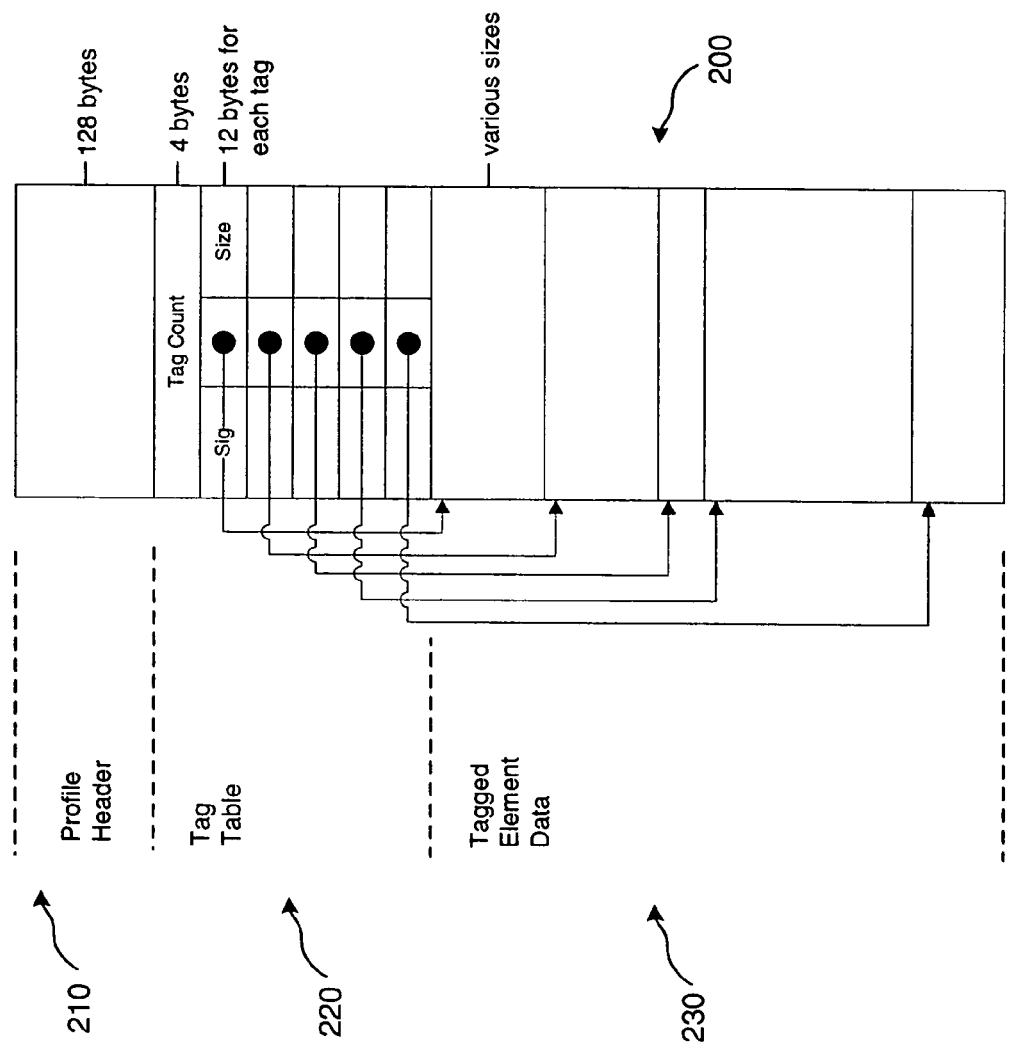

| | | | | | |
|---|---|---|---|---|---|
| DIGITAL RIGHTS MANAGEMENT 420 | COPYRIGHT PROTECTION/TAMPERING PREVENTION 425 | | | | |
| TRANSPARENCY 430 | CONTAINER INTEROPERABILITY 435 | | | | |
| PRIVATE DATA EXTENSIONS 440 | INTERFACE DESCRIPTION LANGUAGE COMPATIBILITY 445 | | | | |
| EXECUTABLE CODE 450 | RENDERING INTENT AND MEASUREMENTS 455 | | | | |
| PROFILE LIBRARY 460 | EDITOR 465 | | | | |

PROFILE FORMAT 410

FIGURE 4

DEVICE COLOR CHARACTERIZATION PROFILE FORMAT

FIELD OF THE INVENTION

Aspects of the present invention are directed generally to color management systems. More particularly, aspects of the present invention are directed to a file format and data structure for operation of a device color characterization profile for use in color management operations.

BACKGROUND OF THE INVENTION

Originally, color management processing was a relatively straight forward and easy operation where images were scanned by one type of input device and reproduction occurred through one output device. Spot corrections were handled during this one step process. However, with the development of computer technology and associated devices, more devices became available for providing and/or handling color management operations. The single image input device became a number of different scanners, monitors, and digital cameras. The one output device became a number of different printers, monitors, and printing presses. Further, numerous manufacturers began to produce digital still cameras, digital video cameras, scanners, monitors, printers, and printing presses, and these same manufacturers began to produce various models of each device, based on different rendering technologies, that all had different device specific color measurement and/or processing data.

The result is an enormously large number of possible configurations of devices, leading to an equally large number of possible conversions from input devices to output devices. FIG. 1A illustrates an example system of configurations between m input devices and n output devices. As shown, input device 110-1 must be able to convert to each output device 120-1 to 120-n. For all input devices 110 to be able to operate with all output devices 120, each input device 110-1 to 110-m must be able to convert to each output device 120-1 to 120-n. As the number of input devices 110 and/or output devices 120 increases, the number of needed conversions increases in a much faster manner. This explosive increase in conversion paths becomes unmanageable under such a system. Under such a system, ten (10) different inputs and ten (10) different outputs require a total of one hundred (100) different conversions, i.e., m*n conversions.

Under color management technology, the number of conversions drops significantly. FIG. 1B illustrates an example color management conversion system. As shown in FIG. 1B, the color management system includes a profile connection space 130. Under the color management system of FIG. 1B, the profile connection space 130 operates as the conversion mechanism between the input devices 110 and the output devices 120. Conversion information between each input device 110 and each output device 120 is no longer needed. One only needs a single conversion between the input device 110 or output device 120 and the profile connection space 130. The profile connection space 130 will perform processing to connect a particular input device, such as input device 110-2 to a particular output device, such as output device 120-3. Each single conversion describes the color reproduction operations and capabilities of the particular device. This conversion description is commonly referred to as a device color characterization profile. Under such a system, ten (10) different inputs and ten (10) different outputs require a total of twenty (20) different conversions, i.e., m+n conversions.

A profile can be described as a file that contains enough information to let a color management system convert colors into or out of a specific color space. Historically, there are two basic profile solutions for managing color in complex systems. The first uses standard color spaces, such as sRGB and scRGB color spaces. The second uses device color characterization profiles, such as the profile format developed by the International Color Consortium (ICC).

The ICC profile format is a file that contains enough color characteristic information of a device to allow a color management system to maintain color characteristic consistently into or out of a specific color space, such as the color space of a printer. The ICC profile file contains text descriptions of specific devices and their settings along with numeric data describing how to transform the color values which are to be displayed or printed on the device. The numeric data includes matrices and tables that a color management module (CMM) uses to convert that device's color results to a common color space, defined by the ICC and called the profile connection space (PCS), and back to the color space of the device. (Wallner, Dawn; *Building ICC Profiles—the Mechanics and Engineering*; http://www.color.org/icc-bookl.pdf; April 2000; page 6).

Generally, there are three classes of profiles: an input profile, a display profile and an output profile. An input profile can describe scanner and digital camera based technologies. A display profile can describe monitor and liquid crystal display type technologies. An output profile can describe printer and press technologies. Profiles are generally either matrix-based or table-based. A detailed explanation of each type of profile can be found on pages 100-103 of Fraser et al., *Real World Color Management*, Peachpit Press, Berkeley, Calif., 2003.

Since inception in 1993, the ICC profile format has been the de facto standard for all profile-based solutions. However, the ICC profile format has many limitations. First, the ICC profile format lacks any type of digital rights management (DRM) capability. Digital media files can be easily copied and distributed. As a result, digital media files are being widely distributed on the Internet today, through both authorized and unauthorized distribution channels. Piracy is a concern when security measures are not in place to protect content. Digital rights management enables content providers to protect their content and maintain control over distribution. Second, the ICC profile format includes a problematic index that requires synchronization. If a corruption of the index of tags of an ICC profile occurs, tags in the ICC profile cannot be found. As a result, time and resources must be spent to rebuild the ICC profile index of tags. Any change to a tag requires synchronization of the index. Third, there is no current free library for reading the ICC profile format. Fourth, the ICC profile format utilizes a standard syntax, but fails to standardize actions and functionality.

Fifth, the ICC profile format lacks interoperability. Any type of support for one platform is different in another platform. The ICC profile lacks eXtensible Markup Language (XML) support for database and metadata integration. Sixth, the ICC profile format lacks transparency. A user has to utilize a specific application to list tags and values, and the ICC profile is not clear as to how tags or values are to be represented or used. Seventh, the ICC profile format includes a copyright tag, but fails to provide any intrinsic system to prevent unauthorized uses or tampering. Eighth, the ICC profile format lacks the ability to provide independent data extensions. A third-party vendor cannot have a private tag associated with a new device from that vendor simply added by extension to an ICC profile. Ninth, edits to an ICC profile require use of a special proprietary editor program of the ICC. Finally, the ICC profile format lacks the ability to contain safe executable code and the ability to store rendering preferences separate from objective measurements. The ICC profile format requires that objective intra-device measurement data be combined with subjective, potentially proprietary inter-device rendering data in a manner that is impossible to deconstruct without access to the original profile creation algorithms. ICC profiles are typically constructed by taking a series of target measurements and then performing a statistical analysis to derive analytical parameters for a particular device model. Such a model might include gamma, offset and gain of a cathode ray tube (CRT) model or uniformly spaced multidimensional lookup table vertices for a printer model. This data concatenation makes it impossible for users to directly edit original measurement data or determine and edit the analytical device model parameters that result from this measurement data.

SUMMARY OF THE INVENTION

There is therefore a need for a color characterization profile format that provides a user with the ability to overcome one or more of the cited ICC profile format limitations. An aspect of the present invention provides a color characterization profile format that contains a color management measurement data portion and a container that is configured to provide digital rights management capabilities over the color characterization profile format.

Another aspect of the invention provides for the container to include both linked and embedded objects and a representation in extensible markup language (XML). The container can be an advanced systems format container (ASF). Still another aspect of the invention provides for a container to be configured to perform different functions, including enabling private data extensions, operating interface description language, storing a rendering intent separate from the color management measurement data portion, the ability to be edited by a text editor application, operability across a plurality of operating platforms, and preventing a user from tampering with the color characterization profile format. This invention provides the ability to provide statistical objective measurements and/or analytical parameters (possibly derived from these measurements). The invention also provides the ability to embed code or instructions to enable third parties to provide, in an efficient manner, the instructions necessary to process the profile data if proprietary extensions are included.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 2 is a block diagram of the ICC profile format;

FIG. 4 is a block diagram of a profile format in accordance with at least one aspect of the present invention.

DETAILED DESCRIPTION OF ILLUSTRATIVE EMBODIMENTS

Figure 1A:
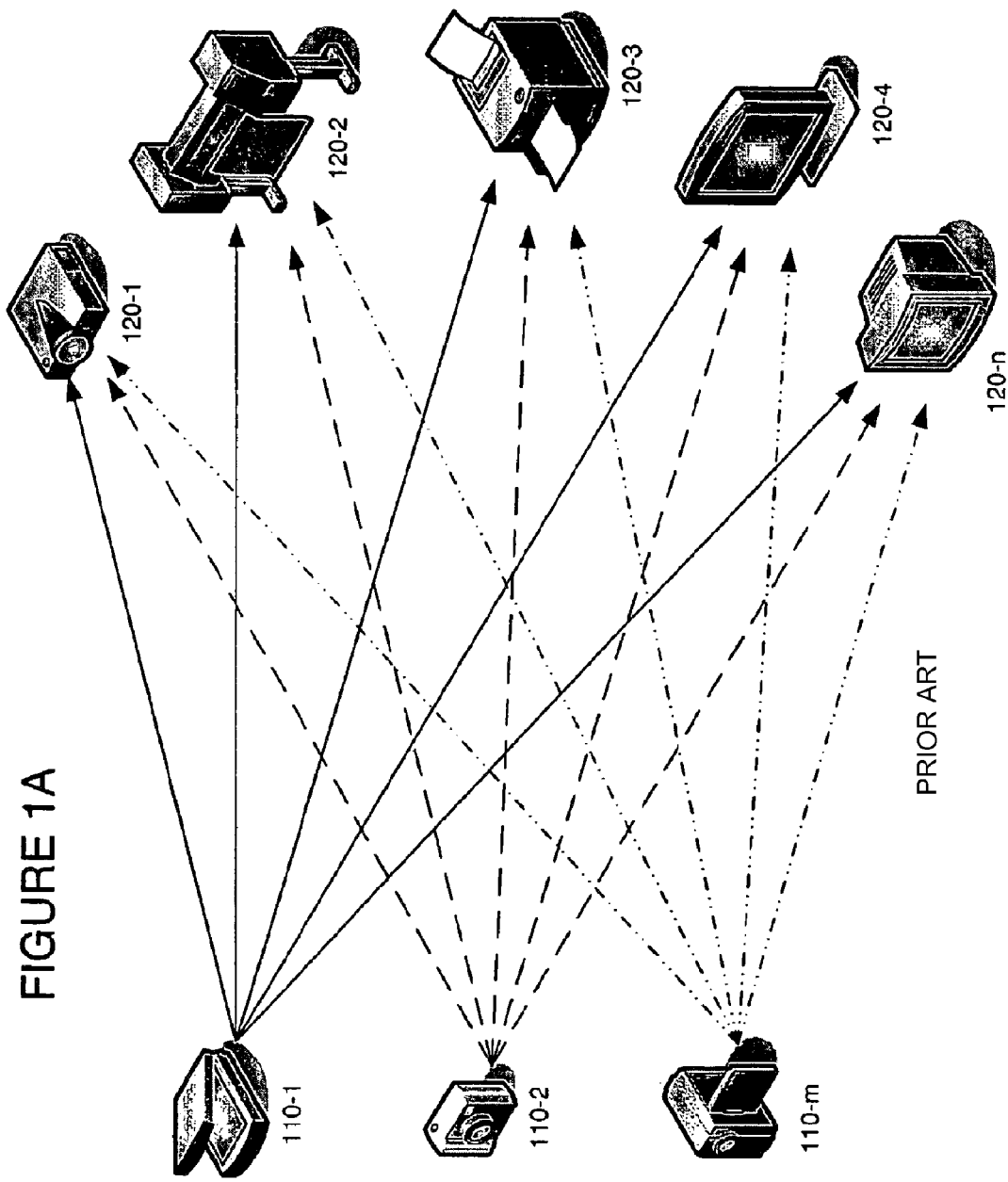
FIGS. 1A and 1B are block diagrams of color management conversion systems.
Figure 1B:
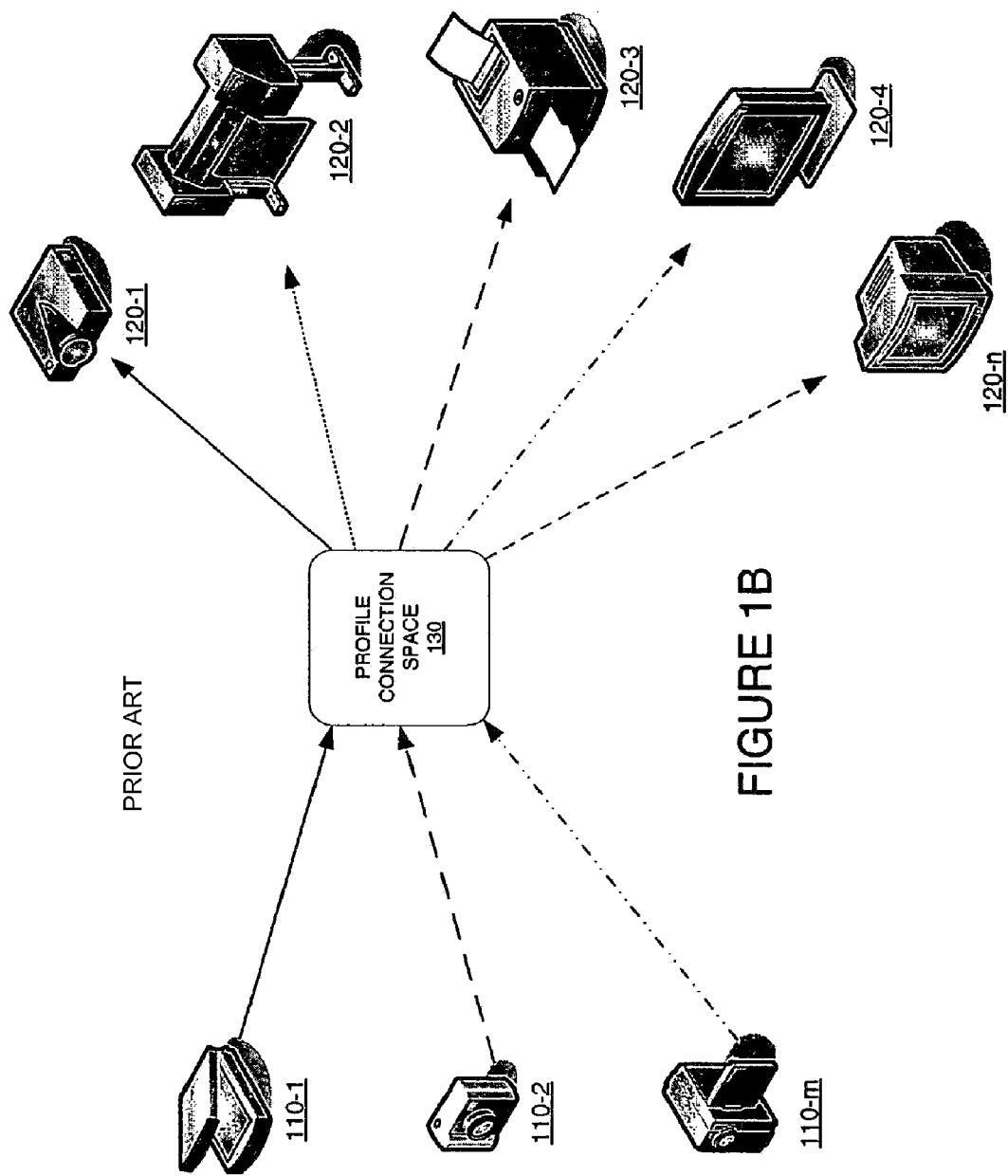

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

FIG. 2 shows a block diagram of the ICC profile format 200. The ICC profile format 200 includes a required 128 byte header 210. Header 210 contains specific encoded parameters, including a. the profile size (number of bytes),
 b. the color management module (CMM) type signature (default CMM),
 c. the profile version (version of ICC profile format specification to which the profile conforms),
 d. the profile class (display device, input device, output device, among others),
 e. the color space signature (for device and non-device color spaces),
 f. the profile connection space signature (currently either CIEXYZ or CIELAB),
 g. the primary platform signature (platform on which profile was created, e.g., Microsoft Corporation®; Apple Computer, Inc.®; Silicon Graphics, Inc.®; Sun Microsystems, Inc.®; etc.),
 h. profile flags (flag 1—standalone or embedded and flag 2—when embedded, can it be extracted),
 i. device manufacturer and model signatures (devices registered with the ICC),
 j. device attributes (media associated with the device the profile applies to),
 k. rendering intent (default rendering intent table),
 l. profile creator signature (creating manufacturer of the profile), and
 m. the profile ID (and optional identification of the profile).

The tag table or index of tags 220 functions similarly to a table of contents for a book. Tag table 220 contains a 4 byte tag count listing the total number of tags in the profile, followed by the tags, e.g., data identifiers, each with a set structure consisting of the number of bytes for the tag's data and a pointer into the file where the data is located. Tag table 220 uses a 4 byte tag signature registered with the ICC, a 4 byte offset to denote where the data corresponding to that tag starts, and a 4 byte size value to denote how long that tag is. The tagged element data 230 is the final portion of the ICC profile format 200. Tagged element data 230 includes data associated with the corresponding tag in the tag table 220. Tagged element data 230 includes white point information, tone response curves, rendering intent tables, etc. Tagged element data 230 can vary in size as shown in FIG. 2 depending on the type of information specified in the tagged element.

Figure 3A:
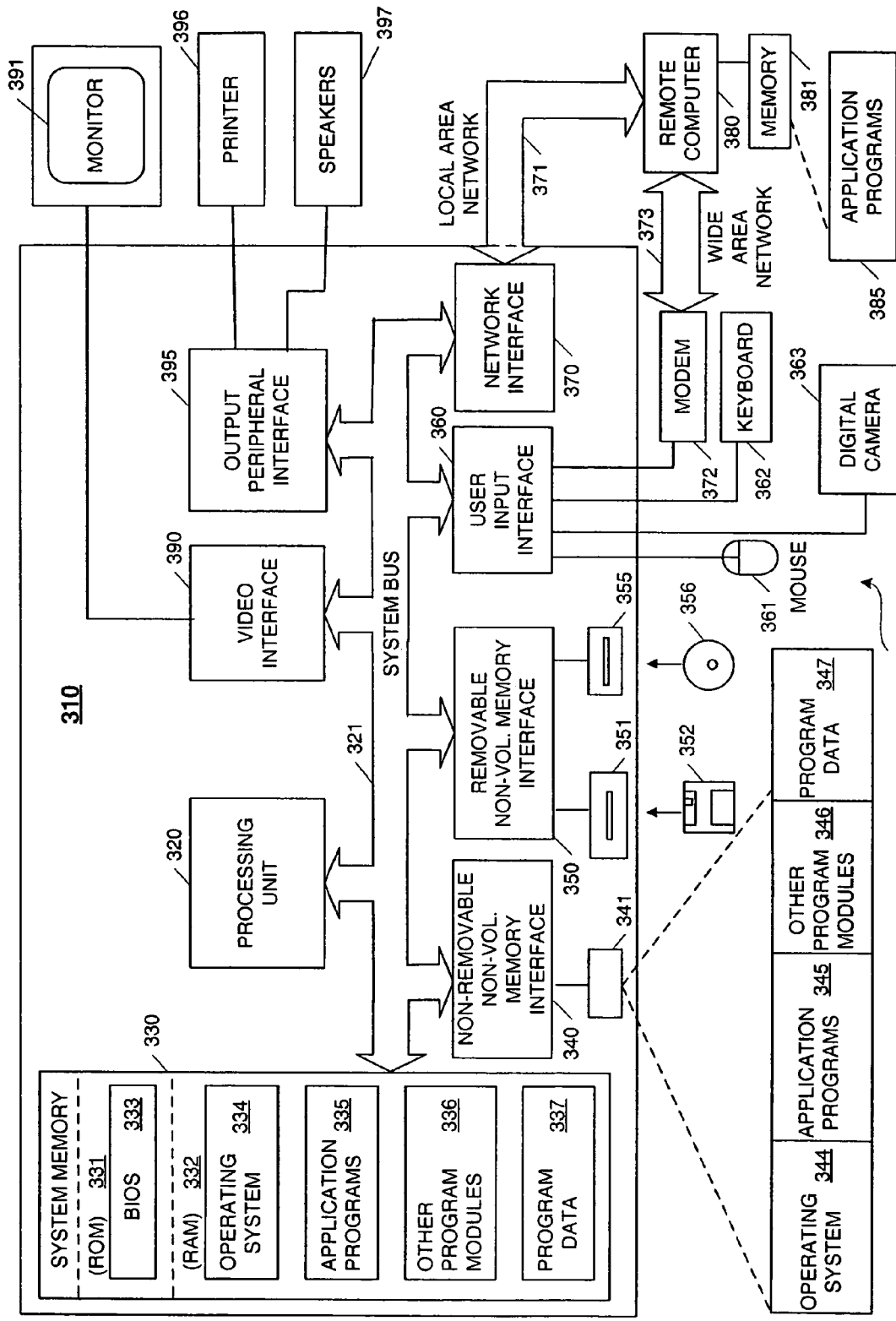
FIG. 3A illustrates a schematic diagram of a general-purpose digital computing environment in which certain aspects of the present invention may be implemented.

FIG. 3A illustrates an example of a suitable computing system environment 300 on which the invention may be implemented. The computing system environment 300 is only one example of a suitable computing environment and is not intended to suggest any limitation as to the scope of use or functionality of the invention. Neither should the computing system environment 300 be interpreted as having any dependency or requirement relating to any one or combination of components illustrated in the exemplary computing system environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3A, an exemplary system for implementing the invention includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as ROM 331 and RAM 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3A illustrates operating system 334, application programs 335, other program modules 336, and program data 337.

The computer 310 may also include other removable/non-removable, volatile/nonvolatile computer storage media. By way of example only, FIG. 3A illustrates a hard disk drive 341 that reads from or writes to non-removable, nonvolatile magnetic media, a magnetic disk drive 351 that reads from or writes to a removable, nonvolatile magnetic disk 352, and an optical disc drive 355 that reads from or writes to a removable, nonvolatile optical disc 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disc drive 355 are typically connected to the system bus 321 by a removable memory interface, such as interface 350.

The drives and their associated computer storage media discussed above and illustrated in FIG. 3A, provide storage of computer readable instructions, data structures, program modules and other data for the computer 310. In FIG. 3A, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a digital camera 363, a keyboard 362, and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3A. The logical connections depicted in FIG. 3A include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3A illustrates remote application programs 385 as residing on memory device 381. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 3C:
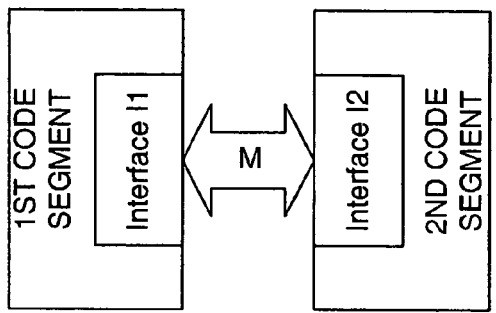
FIGS. 3B through 3M show a general-purpose computer environment supporting one or more aspects of the present invention.
Figure 3E:
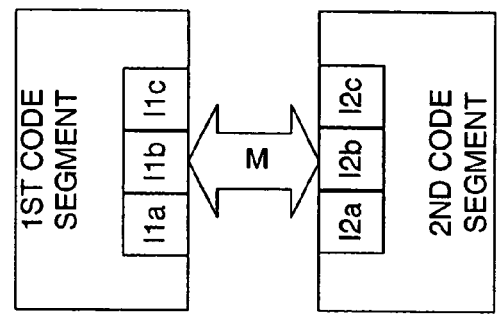
Figure 3B:
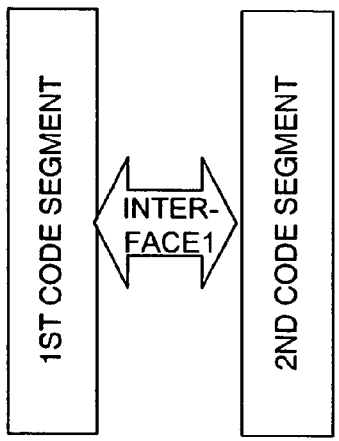

Notionally, a programming interface may be viewed generically, as shown in FIG. 3B or FIG. 3C. FIG. 3B illustrates an interface Interface1 as a conduit through which first and second code segments communicate. FIG. 3C illustrates an interface as comprising interface objects I1 and I2 (which may or may not be part of the first and second code segments), which enable first and second code segments of a system to communicate via medium M. In the view of FIG. 3C, one may consider interface objects I1 and I2 as separate interfaces of the same system and one may also consider that objects I1 and I2 plus medium M comprise the interface. Although FIGS. 3B and 3C show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 3B and 3C, but they nonetheless perform a similar function to accomplish the same overall result. We will now briefly describe some illustrative alternative implementations of a programming interface.

A. Factoring

Figure 3D:
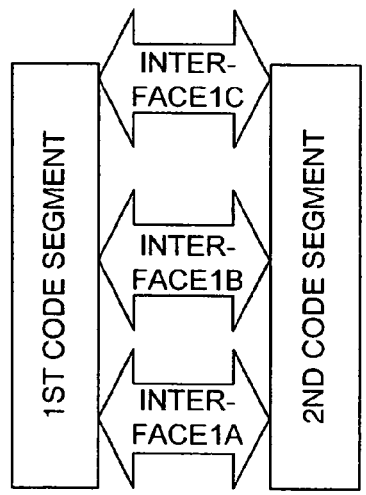

A communication from one code segment to another may be accomplished indirectly by breaking the communication into multiple discrete communications. This is depicted schematically in FIGS. 3D and 3E. As shown, some interfaces can be described in terms of divisible sets of functionality. Thus, the interface functionality of FIGS. 3B and 3C may be factored to achieve the same result, just as one may mathematically provide 24, or 2 times 2 times 3 times 2. Accordingly, as illustrated in FIG. 3D, the function provided by interface Interface1 may be subdivided to convert the communications of the interface into multiple interfaces Interface1A, Interface1B, Interface1C, etc. while achieving the same result. As illustrated in FIG. 3E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 3D and 3E, the functional spirit of interfaces Interface1 and I1 remain the same as with FIGS. 3B and 3C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 3G:
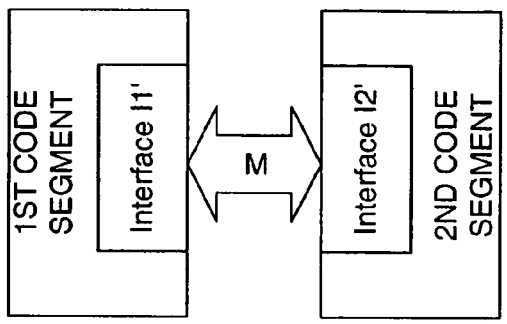
Figure 3I:
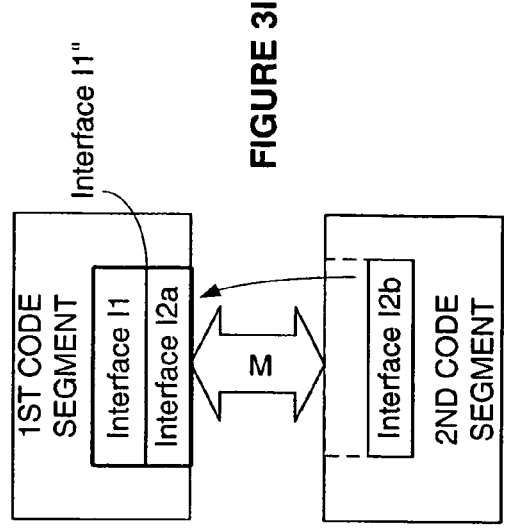
Figure 3F:
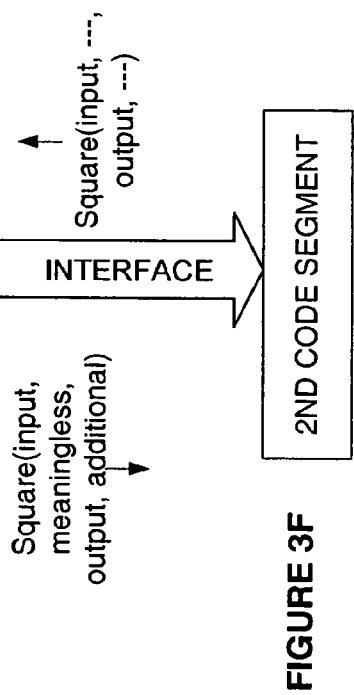

In some cases, it may be possible to ignore, add or redefine certain aspects (e.g., parameters) of a programming interface while still accomplishing the intended result. This is illustrated in FIGS. 3F and 3G. For example, assume interface Interface1 of FIG. 3B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 3F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 3G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 3H:
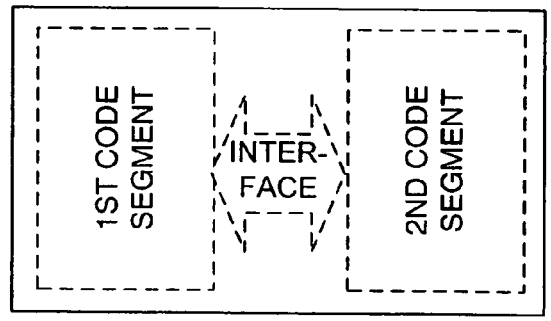

It may also be feasible to merge some or all of the functionality of two separate code modules such that the "interface" between them changes form. For example, the functionality of FIGS. 3B and 3C may be converted to the functionality of FIGS. 3H and 3I, respectively. In FIG. 3H, the previous 1st and 2nd Code Segments of FIG. 3B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 3I, part (or all) of interface I2 from FIG. 3C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 3C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 3K:
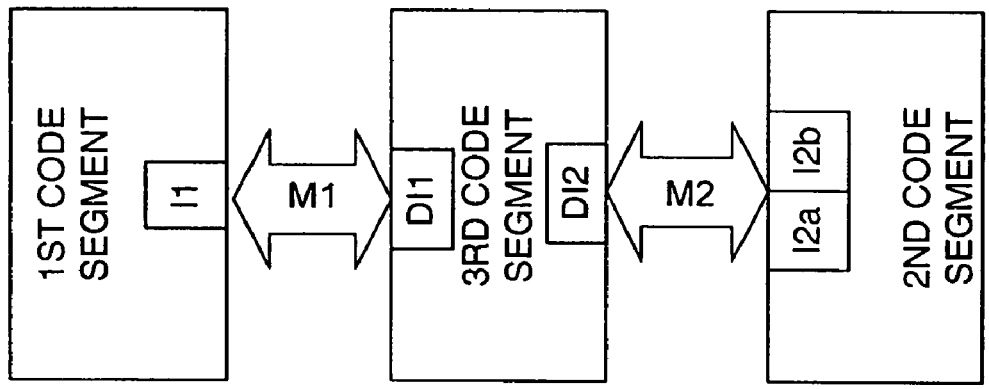
Figure 3J:
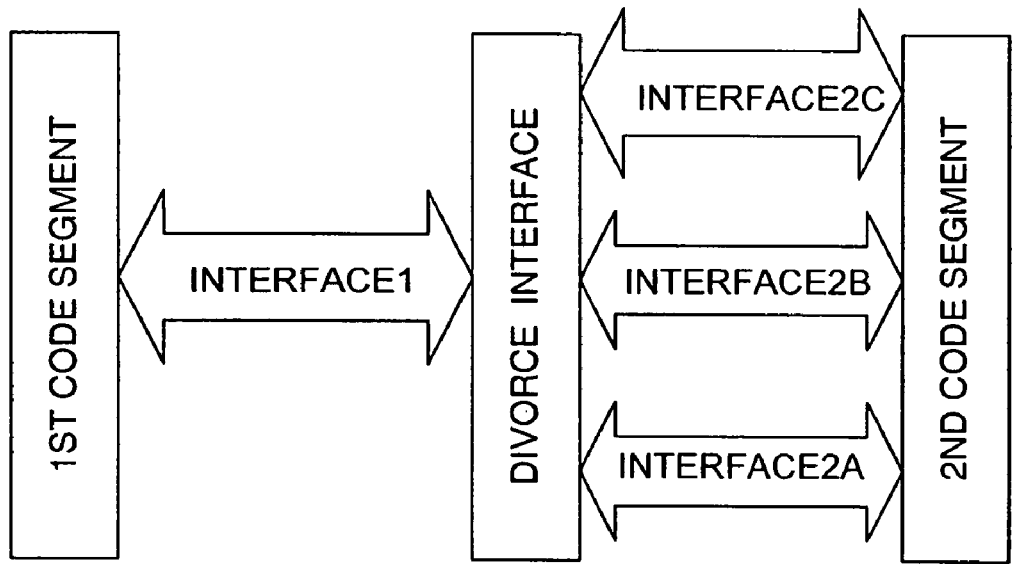

A communication from one code segment to another may be accomplished indirectly by breaking the communication into multiple discrete communications. This is depicted schematically in FIGS. 3J and 3K. As shown in FIG. 3J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 3K, a third code segment can be introduced with divorce interface DI1 to receive the communications from interface I1 and with divorce interface DI2 to transmit the interface functionality to, for example, interfaces 12a and 12b, redesigned to work with DI2, but to provide the same functional result. Similarly, DI1 and DI2 may work together to translate the functionality of interfaces I1 and I2 of FIG. 3C to a new operating system, while providing the same or similar functional result.

E. Rewriting

Figure 3L:
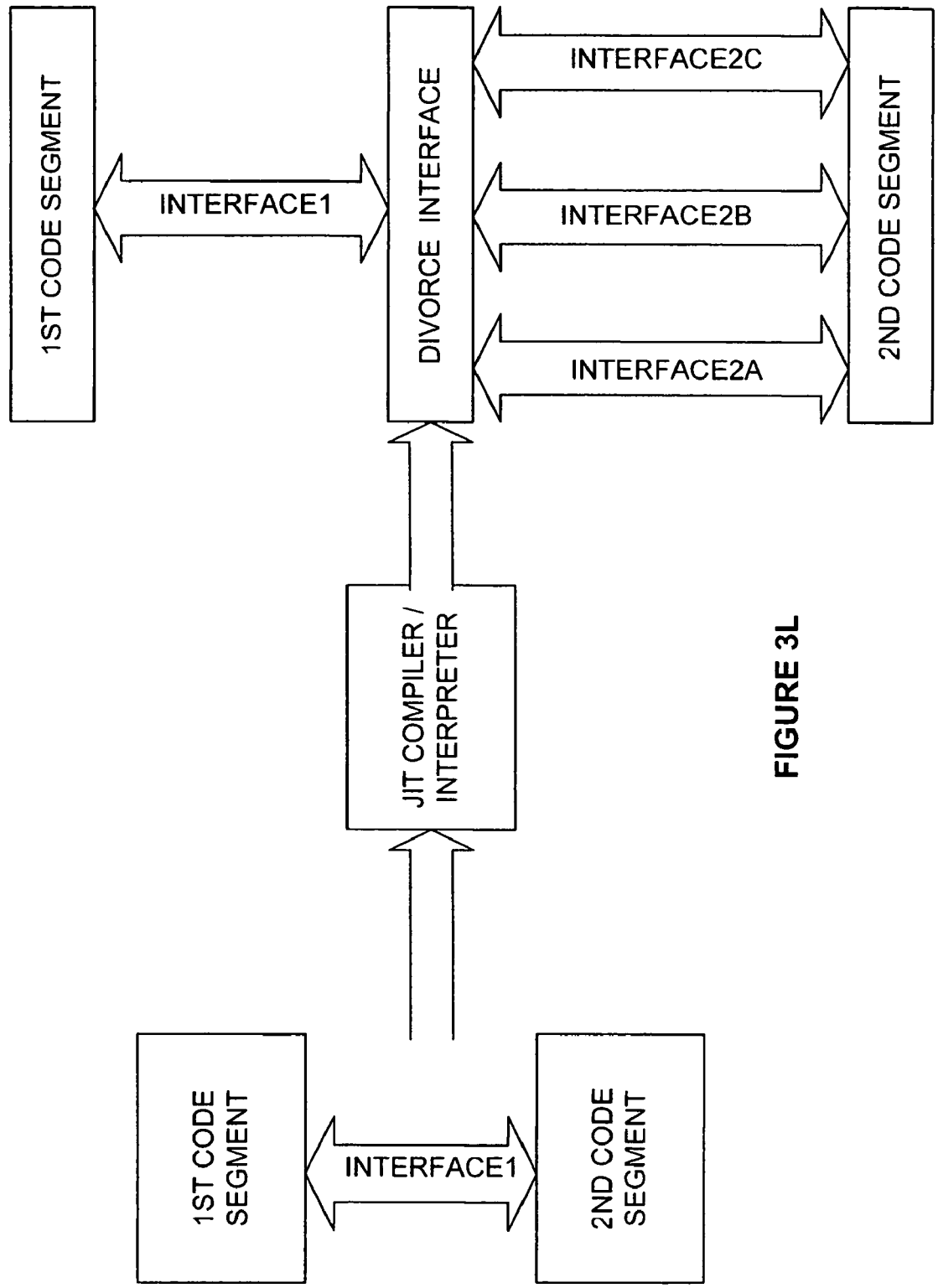
Figure 3M:
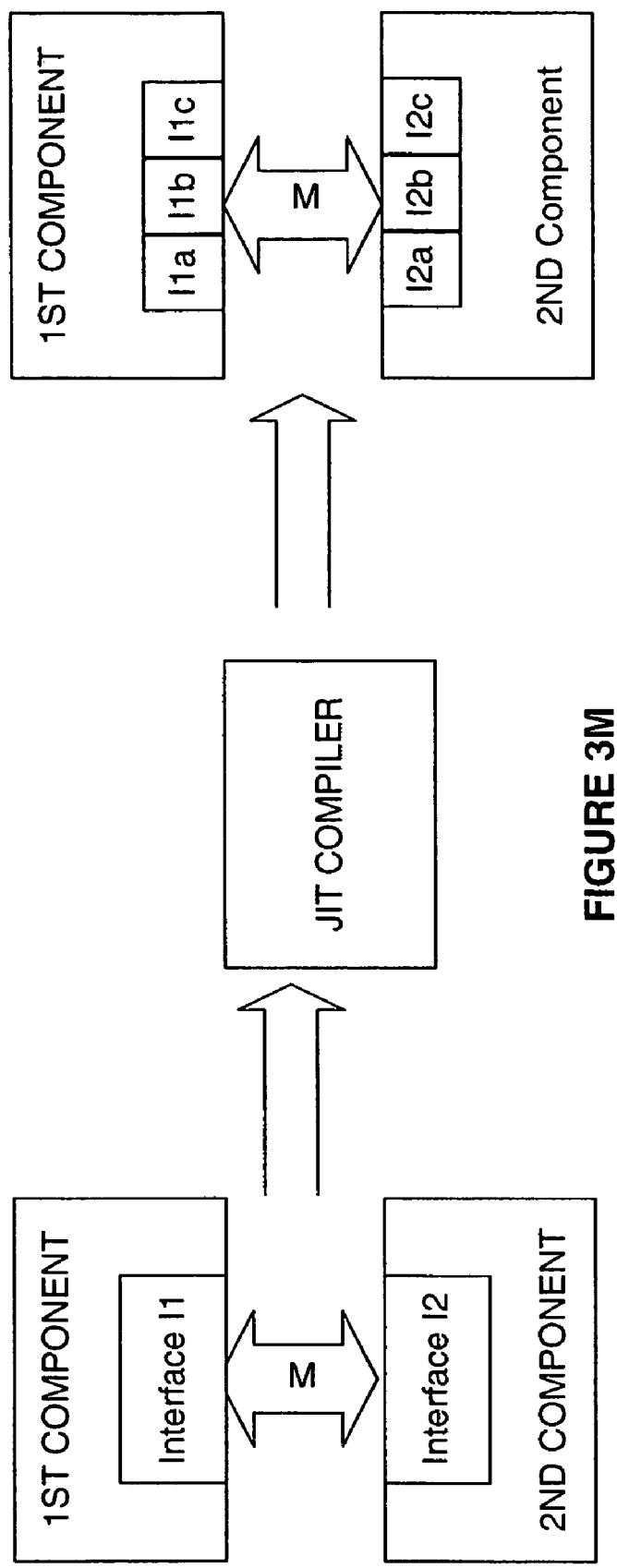

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 3L and 3M. As can be seen in FIG. 3L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 3M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 3B and 3C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIG. 4 is a block diagram of a profile format 410 in accordance with at least one aspect of the present invention. It should be understood by one skilled in the art that a profile format 410 could include one or more of the components as shown in FIG. 4 and that the present invention is not limited to a profile format that includes each component. Profile format 410 is a profile that is to be wrapped in a container. A container, as used herein, is a file format of content. As described below, there are many types of containers. Examples of the present invention are shown in use with extensible markup language (XML), object linking and embedding (OLE), and advanced systems format (ASF) containers. File format 410 is shown to include many components that overcome the limitations of the present standard ICC profile format.

Profile format 410 can include a digital rights management component 420. Digital rights management component 420 provides a flexible format for the secure distribution of digital media content. Digital rights management (DRM) component 420 is a policy based system that ensures that authorized users are utilizing specific digital data in an authorized manner. The current ICC profile format fails to provide any type of DRM protection for content provides to protect their content and maintain control over distribution. Profile format 410 also can include a copyright protection/tampering prevention component 425. Copyright protection/tampering prevention component 425 provides a level of authenticity to the profile format 410. Copyright protection/tampering prevention component 425 utilizes encryption and digital signing technology. Under copyright protection/tampering prevention component 425, none, some, or all data can be encrypted. Further, the data can be authenticated by digital signing technology to ensure that it has not been tampered with. For the ICC profile format, an unauthorized user can easily bypass the copyright tag and simply copy and/or tamper with the underlying data. ICC profile format provides a copyright tag, but it fails to provide any intrinsic system for protection. XML technology permits a signature to be added to part or all of an XML file. Likewise, XML technology allows for encryption of part or all of an XML file. The *XML-Signature Syntax and Processing W3C Recommendation* of Dec. 10, 2002 (http://www.w3.org/TR/xmlenc-core/), and Feb. 12, 2002 (http://www.w3.org.TR/xmldsig-core/), published by the Internet Engineering Task Force (IETF) are herein incorporated by reference.

Transparency component 430 provides for substantially free access to list tags and underlying data. Special application programs are not needed as is needed for operation with the ICC profile format. Container interoperability component 435 provides substantially free access between components within the profile format 410. Further, container interoperability component 435 provides for component operability within different platform containers, e.g., XML, OLE, and ASF. XML is an open international standard. Compared to ICC's proprietary format, XML provides transparency. Further, the ability to separate out the objective intra-device measurements, the analytical parameters derived from those measurements and the rendering intent or gamut mapping form each other make it easier for user and programmers to access the parts of the profile transparently compared with ICC profiles.

Private data extensions component 440 permits independent data extensions to the profile format 410. An independent data extension may include vendor extensions for new models developed by a manufacturer. For example, if camera manufacturer Camera Corporation develops a new model, the X2000 Extreme, to its existing line of X2000 digital cameras, Camera Corporation cannot simply add an extension into the ICC profile format for the device specific capabilities, parameters, and color space information regarding the new X2000 Extreme model. Interface description language (IDL) component 445 provides for compatibility with IDL technology. IDL is a processor independent low level language where multiple language types can be mixed together. For example, IDL is one way for programs that include C++ and Cobalt to be able to function together. IDL offers a secured extension for permitting executable code components 450 to be included in profile format 410. XML namespaces allow for partitioning of the extensions into separate areas, with each area assigned to an organization. Each organization can define its namespace without worrying about conflicts with other organization's extensions. *Namespaces in XML*, IETF, World Wide Web Consortium; Jan. 14, 1999 (www.w3.org/TR/1999/REC-xml-names-19990114)) is herein incorporated by reference. XML schema technology defines the names, types, and allowed values for extensions. The *XML Schema Part 0: Primer W3C Recommendation* (http:/www.w3.org.TR/xmlschema-0/), *XML Schema Part 1: Structures W3C Recommendation* (http:/www.w3.org.TR/xmlschema-1), and *XML Schema Part 2: Datatypes W3C Recommendation* (http:/www.w3.org.TR/xmlschema-2/) of May 2, 2001, published by the Internet Engineering Task Force (IETF) are herein incorporated by reference.

Executable code component 450 contains safe and secured executable code. Executable code component 450 permits incorporation of executable code, such as pertaining to a gamut mapping algorithm for color management processing. Executable code component 450 is designed to permit the inclusion of executable code while restricting access to resources of the device, hardware components of the device, as well as being memory confined. Executable code component 450 is designed to provide virus protection and other unauthorized uses and or manipulations of data that may be attempted through use of the executable code. Rendering intents and measurements component 455 provides for the storage of rendering intent preferences separate from objective measurements. The ICC profile format maintains the rendering intent information and the measurements in a common storage medium. Specification of a particular rendering intent can be made without having any potential effect on the measured data. The *Common Language Infrastructure* (CLI) (Standard ECMA-335; ECMA International; $2^{nd}$ Edition; December 2002 (www.ecma-international.org/publications/files/ECMA-ST/Ecma-335.pdf)) is herein incorporated by reference.

The ICC profile format lacks a free library for reading the ICC profile format. Profile library component 460 provides information for compatibility across different platforms. Profile library component 460 provides application programming interfaces (API), platform support information, and other information for allowing use across various operating platforms. The ICC profile format lacks such ability. Finally, the ICC profile format lacks the ability to have portions changed, added, or deleted by a text editor program. Editor component 465 allows a user to make edits to the profile format 410 without use of a special program specifically designed for the purpose of editing a profile format. The ICC profile format can only be edited by a specifically designed proprietary editor. The sole purpose of this proprietary editor is for edits to ICC profile formats. Editor component 465 allows a user to use any type of text editor program, such as Notepad, Wordpad, and Word by Microsoft, Corporation® of Redmond, Wash. Editor 465 is designed to operate with any type of text editor program and does not require a specific proprietary application for operation. Microsoft Corporation® of Redmond, Wash. provides a proprietary API in ICM2 (Image Color Management 2) as described in MSDN® (Microsoft Developer Network) as an example profile library component. Profile editing is done by either accessing this proprietary API one ICC profile tag at a time or using a stand alone proprietary profile editing application. In accordance with at least one aspect of the present invention, one can use standard XML editors that are widely available, e.g., Notepad by Microsoft Corporation® of Redmond, Wash., to edit the profile directly.

Profile format 410 is designed for operation with a container. Three examples of containers are 1) extensible markup language (XML) containers, 2) object linking and embedding (OLE) containers, and 3) advanced systems format (ASF) containers. XML is a platform-independent industry standard that the World Wide Web Consortium manages. XML is a metalanguage used to create custom markup languages that can define all types of information or data. XML defines information and data according to purpose rather than presentation so that several applications can use the information and data. XML enables developers to create customized tags which cannot be created under existing hypertext markup language (HTML) technology. OLE is a structured storage that allows a user to integrate data from one application to another application. Object linking allows a user to share a single source of data for a particular object across various applications. The document contains the name of the file containing the data, along with a picture of the data. When the source is updated, all the documents utilizing the OLE data are updated in response. OLE allows for embedding the profile format 410 into an input image to be color management processed. Finally, ASF provides a multimedia format for audio (.wma) and video (.wmv) synchronized digital media, typically audio or video, for streaming or interactive delivery. ASF is a nested object container file format. ASF is an extensible file format designed to store coordinated digital media data. ASF supports multimedia data delivery over a wide variety of networks and is also suitable for local playback. Each ASF is composed of one or more digital media streams. The file header specifies the properties of the entire file, along with stream specific properties. At a minimum, ASF includes an ID, a data length indicator, and data. Digital media data references a particular digital media stream number to indicate its type and purpose. The delivery and presentation of all digital media stream data is aligned to a common timeline. The *Advanced Systems Format (ASF) Specification* (Revision 01.20.01e; Microsoft Corporation® of Redmond, Wash.; Sep. 5, 2003 (http://download.microsoft.com/download/e/0/6/e06db390-1e2a-4978-82bb-311819d8a2d/ASF_Specification.doc) is herein incorporated by reference. *Developing Applications with OLE* 2.0 (Kraig Brockschmidt; Sep. 13, 1994 (http://msdn.microsoft.com/library/en-us/dnolegen/html/msdn_devwole2.asp?frame=true)), OLE Integration Technologies: A Technical Overview (Kraig Brockschmidt; October 1994 (http://msdn.microsoft.com/library/en-us/dnolegen/html/msdn_ddjole.asp?frame=true), and *What OLE is Really About* (Kraig Brockschmidt; July 1996 (http://msdn.microsoft.com/library/en-us/dnolegen/html/msdn_aboutole.asp?frame=true)) are herein incorporated by reference.

Table I describes implementation of the ICC profile format limitations in reference to XML, OLE, and ASF file format technologies.

TABLE 1

| File Format and Functionalities | | |
| --- | --- | --- |
| XML | OLE | ASF |
| DRM capability | DRM capability | DRM capability |
| API/Platform Support/Libraries | API/Platform Support/Libraries | API/Platform Support/Libraries |
| Transparent Copyright Protection/ Tampering Prevention | Proprietary Copyright Protection/ Tampering Prevention | Proprietary Copyright Protection/ Tampering Prevention |
| IDL compatibility | IDL compatibility | IDL compatibility |
| Data extensions | Data extensions | Data extensions |
| Editor support | Editor support | Editor support |

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It should also be appreciated and understood that modifications may be made without departing from the true spirit and scope of the present invention. The description is thus to be regarded as illustrative instead of restrictive on the present invention.

We claim:

1. A computer storage medium encoded with a color characterization profile format comprising:
   a color management measurement data portion; and
   a container configured to:
   (1) store a plurality of color profiles associated with a plurality of devices, wherein each of the plurality of color profiles are editable by a generic text editor that is not specifically designed to edit color profiles specific to the container,
   (2) receive and store one or more independent data extensions, wherein the one or more independent data extensions comprise additional extensions of color space information that are specific to an electronic device,
   (3) provide a user operating the generic text editor access to a gamut mapping associated with the additional extensions of color space information,
   (4) add an XML-based signature from a purveyor of the electronic device to the additional extensions of color space information,
   (5) use the XML-based signature to deny the user the ability to edit the additional extensions of color space information, and
   (6) permit incorporation of executable code.

2. The color characterization profile format of claim 1, wherein said container includes at least one linked and embedded object.

3. The computer storage medium of claim 1, wherein said container includes extensible markup language.

4. The computer storage medium of claim 1, wherein said container is an advanced systems format container.

5. The computer storage medium of claim 1, wherein said container is configured to enable private data extensions.

6. The computer storage medium of claim 5, wherein said container is configured to operate interface description language, and to store a rendering intent separate from the color management measurement data portion, wherein said container includes at least one linked and embedded object.

7. The computer storage medium of claim 1, wherein said container is configured to operate interface description language.

8. The computer storage medium of claim 1, wherein said container is configured to store a rendering intent separate from the color management measurement data portion.

9. The computer storage medium of claim 1, wherein said container is configured to be edited by a text editor application.

10. The computer storage medium of claim 1, wherein said container is configured to prevent tampering with the color characterization profile format.

11. The computer storage medium of claim 1, wherein said container is operable across a plurality of operating platforms.

12. The computer storage medium of claim 1, wherein the executable code provides instructions to translate the color management measurement data portion into color management representations.

13. A computer storage medium having a computer-executable data structure for maintaining a color characterization profile format, the data structure comprising:
a color management measurement data portion; and
a container configured to:
(1) store a plurality of color profiles associated with a plurality of devices, wherein each of the plurality of color profiles are editable by a generic text editor that is not specifically designed to edit color profiles specific to the container,
(2) receive and store one or more independent data extensions, wherein the one or more independent data extensions comprise additional extensions of color space information that are specific to an electronic device,
(3) provide a user operating the generic text editor access to a gamut mapping associated with the additional extensions of color space information,
(4) add an XML-based signature from a purveyor of the electronic device to the additional extensions of color space information,
(5) use the XML-based signature to deny the user the ability to edit the additional extensions of color space information, and
(6) permit incorporation of executable code.

14. The computer storage medium of claim 13, wherein said container includes at least one linked and embedded object.

15. The computer storage medium of claim 13, wherein said container is configured to enable private data extensions.

16. The computer storage medium of claim 15, wherein said container is configured to operate interface description language, and to store a rendering intent separate from the color management measurement data portion, wherein said container includes at least one linked and embedded object.

17. The computer storage medium of claim 13, wherein said container is configured to operate interface description language.

18. The computer storage medium of claim 13, wherein said container is configured to store a rendering intent separate from the color management measurement data portion.

19. A computer storage medium encoded with a software architecture for maintaining a color characterization profile format, comprising:
at least one component configured to maintain color management measurement data and a container, said container configured to provide digital rights management capabilities, wherein the container is configured to:
(1) store a plurality of color profiles associated with a plurality of devices, wherein each of the plurality of color profiles are editable by a generic text editor that is not specifically designed to edit color profiles specific to the container,
(2) receive and store one or more independent data extensions, wherein the one or more independent data extensions comprise additional extensions of color space information that are specific to an electronic device,
(3) provide a user operating the generic text editor access to a gamut mapping-associated with the additional extensions of color space information;
(4) add an XML-based signature from a purveyor of the electronic device to the additional extensions of color space information,
(5) use the XML-based signature to deny the user the ability to edit the additional extensions of color space information; and
(6) permit incorporation of executable code; and
at least one application program interface to access the at least one component.

20. The computer storage media encoded with software architecture of claim 19, wherein the at least one application program interface is configured to access the at least one component responsive to a request.

21. A computer storage medium encoded with a color characterization profile comprising:
intra-device objective measurement data;
analytical device model parameter data;
timing data representing when the intra-device measurement data and analytical device model parameter data was last edited;
a container configured to:
(1) store a plurality of color profiles associated with a plurality of devices, wherein each of the plurality of color profiles are editable by a generic text editor that is not specifically designed to edit color profiles specific the container,
(2) receive and store one or more independent data extensions, wherein the one or more independent data extensions comprise additional extensions of color space information that are specific to an electronic device,
(3) provide a user operating the generic text editor access to a gamut mapping-associated with the additional extensions of color space information,
(4) add an XML-based signature from the purveyor of the electronic device to the additional extensions of color space information,
(5) use the XML-based signature to deny the user the ability to edit the additional extensions of color space information, and
(6) permit incorporation of executable code.

22. The computer storage media encoded with the color characterization profile of claim 21, wherein the analytical device model parameter data is derived from statistical analysis of a series of target measurements.

23. The computer storage media encoded with the color characterization profile of claim 21, wherein the timing data determines which of the intra-device objective measurement data and the analytical device model parameter data is used by an application program.

24. The computer storage media encoded with the color characterization profile of claim 21, further comprising a container, wherein the container is configured to provide digital rights management capabilities.

25. The computer storage media encoded with the color characterization profile of claim 24, wherein the digital rights management capabilities prevent changes to the intra-device objective measurement data and the analytical device model parameter data.

26. The computer storage media encoded with the color characterization profile of claim 24, wherein the container includes extensible markup language.

27. The computer storage media encoded with the color characterization profile of claim 24, wherein the container is an advanced systems format container.

28. The computer storage media encoded with the color management characterization profile of claim 21, wherein the executable code provides instructions to translate the intra-device objective measurement data into color measurement representations.

29. The computer storage media encoded with the color management characterization profile of claim 21, wherein the executable code provides instructions to translate the analytical device model parameter data into color measurement representations.

* * * * *